United States Patent
Wang

(10) Patent No.: US 8,601,051 B2
(45) Date of Patent: Dec. 3, 2013

(54) METHOD, SYSTEM AND APPARATUS FOR CHANGING AVATAR IN ONLINE GAME

(75) Inventor: Hui Wang, Shenzhen (CN)

(73) Assignee: Tencent Technology (Shenzhen) Company Ltd., Shenzhen (CN)

( * ) Notice: Subject to any disclaimer, the term of this patent is extended or adjusted under 35 U.S.C. 154(b) by 454 days.

(21) Appl. No.: 12/603,922

(22) Filed: Oct. 22, 2009

(65) Prior Publication Data

US 2010/0121915 A1 May 13, 2010

Related U.S. Application Data

(63) Continuation of application No. PCT/CN2008/070260, filed on Feb. 3, 2008.

(30) Foreign Application Priority Data

Apr. 28, 2007 (CN) .......................... 2007 1 0097230

(51) Int. Cl.
- G06F 15/16 (2006.01)
- G06T 11/00 (2006.01)
- G06T 5/00 (2006.01)
- G06F 7/04 (2006.01)

(52) U.S. Cl.
USPC ........... 709/203; 709/206; 345/467; 345/678; 726/3

(58) Field of Classification Search
USPC ................ 703/203, 206; 345/467, 689; 726/3
See application file for complete search history.

(56) References Cited

U.S. PATENT DOCUMENTS

| | | | |
|---|---|---|---|
| 7,146,296 B1 * | 12/2006 | Carlbom et al. .................. 703/5 |
| 7,637,806 B2 * | 12/2009 | Rhyne et al. ...................... 463/9 |
| 2006/0031578 A1 * | 2/2006 | Pelletier ........................ 709/245 |
| 2006/0075053 A1 * | 4/2006 | Xu et al. ........................ 709/206 |
| 2008/0158232 A1 * | 7/2008 | Shuster ........................... 345/474 |
| 2008/0215995 A1 * | 9/2008 | Wolf ............................... 715/758 |
| 2010/0018382 A1 * | 1/2010 | Feeney et al. ................... 84/615 |

FOREIGN PATENT DOCUMENTS

| | | |
|---|---|---|
| CN | 1462944 A | 12/2003 |
| CN | 1522042 | 8/2004 |
| CN | 1945588 A | 4/2007 |
| CN | 1953380 A | 4/2007 |
| CN | 101071457 A | 11/2007 |

OTHER PUBLICATIONS

Office Action (with English language translation) for Vietnamese Patent Application No. 1-2009-02532, dated Apr. 22, 2011.
Office Action (with English language translation) for Chinese Patent Application No. 2007100982304 dated Nov. 7, 2008.

* cited by examiner

*Primary Examiner* — Mohamed Ibrahim
*Assistant Examiner* — Thomas Richardson
(74) *Attorney, Agent, or Firm* — Marshall, Gerstein & Borun LLP

(57) ABSTRACT

A method for changing an avatar in an online game includes: generating an avatar self-defined data packet comprising complete data of an avatar according to an avatar characteristic self-defined data packet from a client corresponding to a logon account, wherein the avatar characteristic self-defined data packet reflects modification or creation made by a player to the avatar; and transmitting the avatar self-defined data packet to the client corresponding to the logon account providing the avatar characteristic self-defined data packet, and/or a second client participating in the online game. A system and an apparatus for changing an avatar in an online game are also provided.

7 Claims, 3 Drawing Sheets

METHOD, SYSTEM AND APPARATUS FOR CHANGING AVATAR IN ONLINE GAME

CROSS-REFERENCE TO RELATED APPLICATION

This is a continuation of International Application No. PCT/CN2008/070260, filed Feb. 3, 2008, which claims the priority benefit of Chinese Patent Application No. 200710097230.4, filed Apr. 28, 2007, the entire respective disclosures of which are incorporated herein by reference.

FIELD OF THE INVENTION

The present invention relates to Internet techniques, and more particularly, to method, system and apparatus for changing an avatar in online game.

BACKGROUND OF THE INVENTION

Online game has become an important economic industry. Currently, most computers have a large number of players, and competitions between different games become more and more severe.

In most online games, one avatar corresponding to one logon account may be provided to a player in a game world. Avatars have their respective special appearances, voices, actions and may be evolved during the game. In virtual world of the online game, players map roles and grades in true-life into the game and establish a complicated virtual society. What is more, the players even own some things and abilities which cannot be realized in the true-life. For each player, his/her appearance, voice and actions in the network society have become a symbol for his/her identity and are very significant to the player. Therefore, the avatar in the online game, including characteristics of visual appearances, voices, actions, becomes more and more complicated, and the characteristics of the avatar enable the player to form his/her own social role in a virtual society created in the online game. During the online game, what attracts the player to proceed with the game is the improvement of ability of the avatar through upgrading. Besides the ability, the player also prefers a vivid avatar so that the avatar has vivid characteristics.

In existing games, all details and a variation scope of the avatar to be presented have been determined when the account is registered. Once the registration is finished, the avatar of the player will evolve according to a fixed design course. The avatar may have some changes along with changes of a grade and a weapon. However, the scope of the changes of the avatar is rather limited. For example, a player registered as a cavalier only can select his/her avatar from limited avatars, and cannot use weapons and fineries of enchanters. With the upgrade of the avatar, the player can only make the avatar change within the limited scope because the course of the changes has been fixed by game designers. Actually, in the prior art, all possible changes of the appearance, voice and actions of the avatar have been determined at the very beginning of the game. The player cannot change them randomly, which results in a poor experience of the player and cannot meet the requirement of the player.

In the prior art, in order to have a more special avatar, some players improve audio effect of the avatars through substituting a system audio file in a local client. However, this operation only changes the audio file in the local client and the changed audio file cannot be provided to other clients through an online game server. Therefore, only the audio feature in the local client changes while the audio feature in the other clients in the online game keeps unchanged. Moreover, the substitution in the local client cannot change the visual appearance of the avatar.

SUMMARY OF THE INVENTION

Embodiments of the present invention provide a method, system and apparatus for changing an avatar in an online game, which makes the avatar changeable according to a player's requirement and increases interest of the player in the online game.

The technical solution of the present invention is as follows:

According to an embodiment of the present invention, a method for changing an avatar in an online game includes:

generating an avatar self-defined data packet comprising complete data of an avatar according to an avatar characteristic self-defined data packet from a client corresponding to a logon account, wherein the avatar characteristic self-defined data packet reflects modification or creation made by a player to the avatar; and transmitting the avatar self-defined data packet to the client corresponding to the logon account providing the avatar characteristic self-defined data packet, and/or a second client participating in the online game.

According to another embodiment of the present invention, a system for changing the avatar in the online game is provided. The system includes: an apparatus for changing an avatar in an online game, a client corresponding to a logon account and a second client participating in the online game; wherein the apparatus for changing an avatar in the online game is adapted to generate an avatar self-defined data packet including complete data of an avatar according to an avatar characteristic self-defined data packet from the logon account of the client, and transmit the generated avatar self-defined data packet to the client corresponding to the logon account, and/or the second client; wherein the avatar characteristic self-defined data packet reflects modification or creation made by a player to the avatar.

According to still another embodiment of the present invention, an apparatus for changing an avatar in the online game includes: an avatar self-defined data packet generating unit and an avatar self-defined data packet transmitting unit; wherein the avatar self-defined data packet generating unit is adapted to generate an avatar self-defined data packet including complete data of an avatar according to an avatar characteristic self-defined data packet from a client corresponding to a logon account, and send a transmission request to the avatar self-defined data packet transmitting unit; wherein the avatar characteristic self-defined data packet reflects modification or creation made by a player to the avatar; and the avatar self-defined data packet transmitting unit is adapted to transmit, after receiving the transmission request, the avatar self-defined data packet to the client corresponding to the logon account and/or a second client participating in the online game.

As can be seen from the above technical solution, an avatar self-defined data packet is generated according to an avatar characteristic self-defined data packet corresponding to the logon account from the client. The avatar self-defined data packet is transmitted to the client corresponding to the logon account, and/or the second client participating in the online game. Compared with the prior art, the solution of the embodiments of the present invention makes the avatar changeable according to the player's requirement and therefore can attract more individuated players.

DETAILED DESCRIPTION OF THE INVENTION

The present invention will be described hereinafter in detail with reference to accompanying drawings and embodiments to make the technical solution and merits of the present invention clearer.

Figure 1:
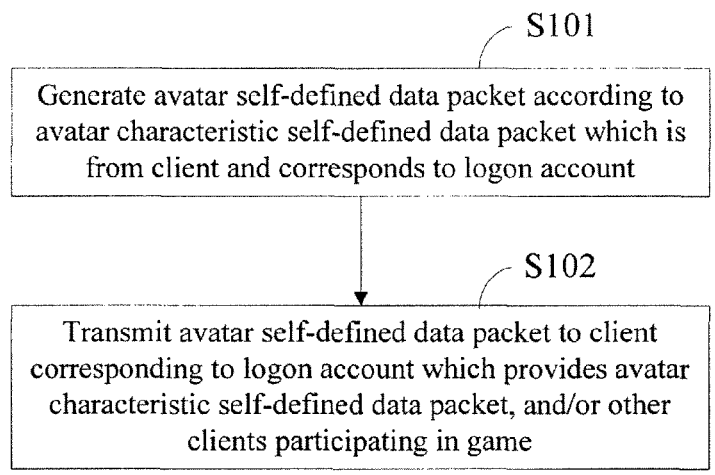
FIG. 1 is a flowchart illustrating a method for changing an avatar in an online game according to an embodiment of the present invention.

FIG. 1 is a flowchart illustrating a method for changing an avatar in an online game according to an embodiment of the present invention. As shown in FIG. 1, the method includes the following steps.

At Step S101, an avatar self-defined data packet is generated according to an avatar characteristic self-defined data packet which is from a client and corresponds to a logon account.

In this embodiment, Step S101 should be performed after successful logon of a player.

At Step S102, the avatar self-defined data packet is transmitted to the client corresponding to the logon account which provides the avatar characteristic self-defined data packet, and/or, to the other clients joining the online game.

During the online game, different clients may request displaying the avatar of a certain account. The client corresponding to the logon account of the player having the avatar may also request displaying the avatar. Therefore, in this embodiment, the avatar self-defined data packet may be transmitted, in step S102, to the client corresponding to the logon account and/or to the other clients joining the online game.

Figure 2:
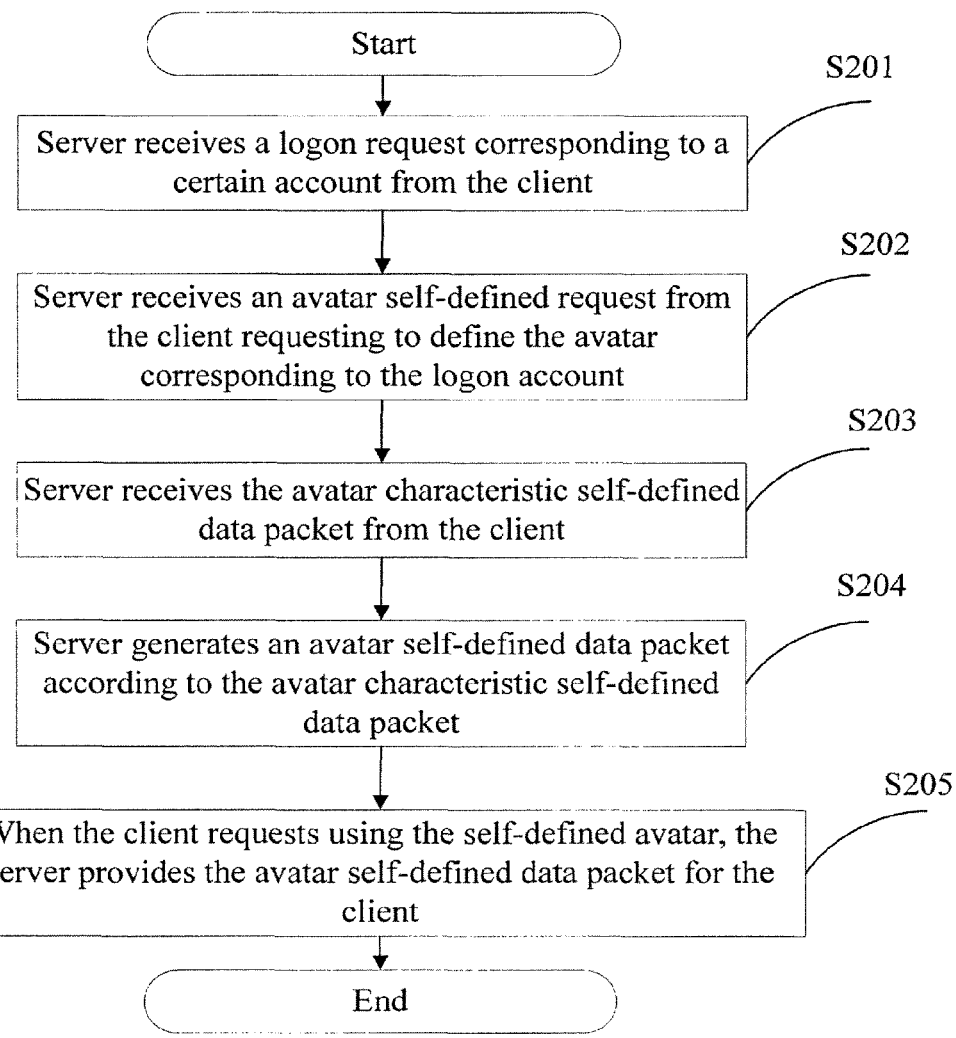
FIG. 2 is a flowchart illustrating a detailed process of changing an avatar in an online game according to an embodiment of the present invention.

In order to make the technical solution and merits of the present invention clearer, the present invention will be described in detail hereinafter with reference to a flowchart of a method for changing an avatar in the online game according to an embodiment. FIG. 2 is a flowchart illustrating a method for changing an avatar in the online game according to an embodiment of the present invention. In this embodiment, a server is taken as an example of an apparatus which changes the avatar in the online game, and the client corresponding to a logon account is taken as an exemplary client. Further, unless especially pointed out, the apparatus for changing the avatar in the online game is referred to as a server and the client corresponding to the logon account is referred to as a client in the embodiments for simplicity. As shown in FIG. 2, the method includes the following steps.

At Step S201, the server receives a logon request corresponding to a certain account from the client.

In this step, a player logs on the server using his/her registered account through any client on the network. Afterwards, the server performs operations such as password checking for the logon account, so as to confirm the logon request. Then, step S202 is perforated.

At Step S202, the server receives an avatar self-define request from the client to request self-defining the avatar corresponding to the logon account.

After the logon request of the player is confirmed in Step S201, the player may send the avatar self-define request in this step to inform the server to prepare to receive an avatar characteristic self-defined data packet from the client. After the server sends a "preparation complete" message to the client, the client may send the avatar characteristic self-defined data packet to the server. Then, Step S203 is performed.

At Step S203, the server receives the avatar characteristic self-defined data packet from the client.

In this embodiment, the avatar characteristic self-defined data packet is a data packet corresponding to the avatar self-define request in Step S202, i.e. the avatar characteristic self-defined data packet corresponds to a certain account logged on the server from the client.

The avatar characteristic self-defined data packet is a data packet edited by the player at the client. The avatar characteristic self-defined data packet reflects the player's modifications or creations to the avatar. The avatar characteristic self-defined data packet corresponds to a certain logon account and is used to self-define the avatar of the logon account.

The avatar characteristic self-defined data packet may include complete avatar data self-defined by the player. In other words, a complete avatar can be obtained according to the avatar characteristic self-defined data packet. In this case, there are many ways for the player to generate the avatar characteristic self-defined data packet at the client. For example, the player may be provided with a special avatar editor at the client. The player may obtain his/her favorite picture by way of cutting, and paste the picture to a corresponding portion of the avatar to obtain a self-defined avatar. Then, the self-defined avatar may be stored in a pre-defined format and converted into an avatar characteristic self-defined data packet to be sent to the server. The above is only an exemplary editing method. Actually, the player may edit the avatar by various ways.

However, the most possible case is that, in the above avatar characteristic self-defined data packet, avatar characteristic data are stored corresponding to avatar characteristic identifiers. In this case, it is possible to provide self-defined avatar characteristic data corresponding to a single avatar characteristic instead of providing the complete avatar data of the avatar, which meets the requirements of most players better. In this case, the server provides the client with the avatar characteristic identifiers of avatar characteristics which can be self-defined. At the client, a picture edited by an image processing file may be taken as self-defined avatar characteristic data. The self-defined avatar characteristic data may correspond to the avatar characteristic identifiers which are provided by the server and can be self-defined. After the client defines the avatar characteristics corresponding to each avatar characteristic identifier, the avatar characteristic identifiers and the corresponding self-defined avatar characteristic data may be stored in a pre-defined format to form an avatar characteristic self-defined data packet to be sent to the server.

In the avatar characteristic self-defined data packet containing the avatar characteristic identifiers and the corresponding self-defined avatar characteristic data, the avatar characteristics requiring modification are identified by the avatar characteristic identifiers. Further, the avatar characteristic data corresponding to the avatar characteristic identifiers are stored in the avatar characteristic self-defined data packet. Specifically, a following manner may be adopted: providing a list of avatar characteristics allowed to be changed at the client; according to the list, the player may configure pictures edited by the player in any way into corresponding avatar characteristic items; then all the newly defined avatar characteristic items are stored in a pre-defined data format to form the avatar characteristic self-defined data packet which is then sent to the server.

In the prior art, there are many methods to edit a picture, and hair style designing software may be taken as a reference. The hair style designing software firstly shoots a user head portrait by a camera. Then effects of different hair styles may be seen on the screen. This is actually similar to what the player needs to do to self-define the avatar in this embodiment. Firstly, a characteristic to be replaced is selected, e.g. facial characteristic, costume, weapon, etc. Then, proper avatar data are selected, such as the downloaded or self-created pictures or video. Then, minor adjustment is performed according to a combined effect-view on the computer, including zoom in, zoom out, display angle changing, light and shadow adjustment, color adjustment, adding words to a special position, etc. Finally, the avatar characteristic self-defined data packet formed by the final result is sent to the server. The server stores the avatar characteristic self-defined data packet. Thus, the avatar characteristic data in the avatar characteristic self-defined data packet may be invoked directly during a game.

The above-mentioned avatar characteristic may be a visual characteristic, voice characteristic or action characteristic.

At Step S204, the server generates an avatar self-defined data packet according to the avatar characteristic self-defined data packet.

In this embodiment, the avatar characteristic self-defined data packet is from the client. Therefore, the avatar characteristic self-defined data packet cannot be provided to each client before being converted into the avatar self-defined data packet at the server. Thus, the avatar characteristic self-defined data packet form the client needs to be converted firstly.

The avatar self-defined data packet includes complete avatar data. The complete avatar data are formed by combining an original avatar, i.e. the avatar pre-defined in the game, with the self-defined characteristic data in the avatar characteristic self-defined data packet. Thus, a complete user-self-defined avatar can be obtained through the avatar self-defined data packet.

Certainly, if the avatar characteristic self-defined data packet provided by the client includes the complete avatar data defined by a player, the server may directly use the avatar characteristic self-defined data packet since the avatar data are complete. The server directly stores the avatar characteristic self-defined data packet as the avatar self-defined data packet.

Generally, the avatar characteristic self-defined data packet provided by the client includes avatar characteristic data stored in accordance with avatar characteristic identifiers. At this time, it is necessary to combine the data in the avatar characteristic self-defined data packet with the data in an original avatar data packet stored in the server so as to obtain a complete avatar self-defined data packet. The original avatar data packet stores the avatar data of the standard avatar provided by the game.

Figure 3:
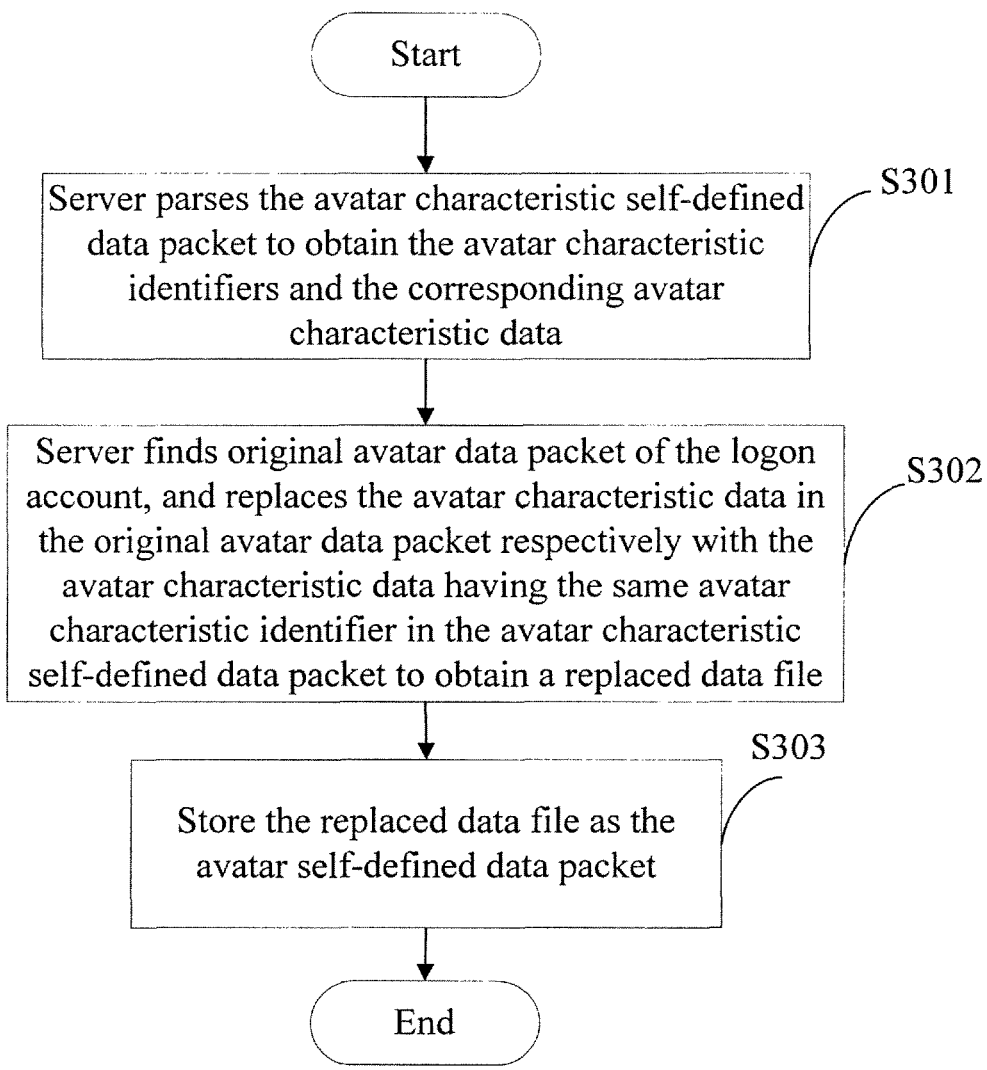
FIG. 3 is a flowchart of generating an avatar self-defined data packet based on an avatar characteristic self-defined data packet according to an embodiment of the present invention.

The data in the avatar characteristic self-defined data packet is combined with the data in the original avatar data packet so as to generate the avatar self-defined data packet. FIG. 3 is a flowchart illustrating a method of generating the avatar self-defined data packet from the avatar characteristic self-defined data packet. As shown in FIG. 3, the method includes the following steps.

At Step S301, a server parses the avatar characteristic self-defined data packet to obtain avatar characteristic identifiers and corresponding avatar characteristic data.

Generally, the avatar characteristic self-defined data packet and the avatar self-defined data packet have the same avatar characteristic identifiers. In this embodiment, the server first parses the avatar characteristic self-defined data packet from the client for the purpose of dividing the data in the avatar characteristic self-defined data packet into the data corresponding to the avatar characteristic identifiers in the original avatar data packet stored in the server, so as to correctly update the data in the original avatar data packet according to the data in the avatar characteristic self-defined data packet. Further, as the avatar characteristic self-defined data packet and the avatar self-defined data packet have the same avatar characteristic identifiers, the two data packets can correspond to each other.

At Step S302, the server finds the original avatar data packet of a logon account, and replaces the avatar characteristic data in the original avatar data packet respectively with the avatar characteristic data having the same avatar characteristic identifier in the avatar characteristic self-defined data packet to obtain a replaced data file.

In this step, the data in the original avatar data packet is replaced by the corresponding data in the avatar characteristic self-defined data packet. Actually, this step realizes changing some original avatar characteristic provided by the game to the avatar characteristic defined by the player.

At Step S303 the replaced data file is stored as the avatar self-defined data packet.

In this embodiment, the above replaced data file is obtained through combining the avatar characteristic data defined by the player with the avatar characteristic data of the original avatar provided by the game. Therefore, the avatar self-defined data packet can display an expected avatar of the player.

However, the player may not choose to display his/her self-defined avatar at other clients. Therefore, it is necessary to store the replaced data file as a dedicated avatar self-defined data packet. Both the avatar self-defined data packet and the original avatar data packet are stored in the server. When it is required to provide avatar to the client, the server may provide different data packets to the client according to different requests of the client.

As can be seen, through the above method, the server is enabled to generate the avatar self-defined data packet according to the avatar characteristic self-defined data packet from the client, and therefore can provide the client with the avatar defined by the player.

In addition, during the game design, there may be some requirements for each avatar characteristic, e.g. some rules about the size and color, and improper modifications are not allowed by these rules. Therefore, before Step S302, it is determined whether the avatar characteristic data extends beyond a pre-defined scope. If not, Step S302 is performed.

At Step S205, when the client requests to use the self-defined avatar, the server provides the client with the avatar self-defined data packet.

During the online game, different clients may request displaying the avatar of the same account. Further, the client where the player of the avatar logs on may also request displaying the avatar. Therefore, in this embodiment, when it is needed to use the self-defined avatar in Step S205, the server may provide the avatar self-defined data packet for clients participating in the online game besides the client corresponding to the logon account providing the avatar characteristic self-defined data packet.

In this embodiment, besides the self-defined avatar, the server may also provide the original avatar corresponding to the account for the client. Generally, which avatar will be sent by the server is determined by settings of the logon account of the client. Preferably, the clients which are counterparts of the client owning the avatar and require the avatar may have a power to choose an avatar. Specifically, when the clients participating in the game require the self-defined avatar owned by the client corresponding to the logon account providing the avatar characteristic self-defined data packet, the server firstly checks the settings of the logon accounts of the clients requiring the self-defined avatar, and determines whether the logon accounts allow using the self-defined avatar of the logon account providing the avatar characteristic self-defined data packet. If yes, the server sends the avatar self-defined data packet to the clients participating in the game.

In addition, in order to make the game more smooth, the avatar in the avatar self-defined data packet may be stored in the client corresponding to the logon account. In other words, after sending the avatar self-defined data packet to any client on the network, the logon account corresponding to the client stores the avatar self-defined data packet. When it is necessary to invoke the avatar again, the locally-stored avatar self-defined data packet will be used. In the online game, the same avatar may appear in the virtual world of the same logon account of a client for many times. If the logon account has stored the avatar in the client, the server may not send the data packet to logon account, thereby increasing the speed of the game.

Furthermore, in consideration that the player may define the avatar again during the game, when the client storing the avatar self-defined data packet logs on again through the logon account storing the avatar self-defined data packet, the server checks whether the avatar self-defined data packet stored by the client is the same as the current avatar self-defined data packet corresponding to the logon account providing the avatar characteristic self-defined data packet. If not the same, the server sends a new avatar self-defined data packet to the client in order to update the avatar self-defined data packet stored in the client.

In addition, in the above embodiment, if client A finds, through information provided by the server, that another online client B has a self-defined avatar and the avatar characteristic self-defined data packet of client B is complete avatar data, the client A may directly request the client B to transmit the avatar self-defined data packet. After authentication, the client B may transmit the avatar characteristic self-defined data packet directly to the client A in a Point-to-Point mode. After receiving the avatar characteristic self-defined data packet and performing security authentication, the client A may locally store and use contents in the avatar characteristic self-defined data packet. The above Point-to-Point mode is applicable in a situation that the server is too busy.

Furthermore, in an embodiment of the present invention, an exchange and business market may be configured in the online game to facilitate the players to exchange their avatar settings. Thus, the market may adopt a manner of extracting tax to earn virtual coins in the game or requiring certain experience values to finish the business. Furthermore, in an embodiment of the present invention, different scopes of changing the avatars may be set respectively for the players of different grades. For example, the players in grade 10 or above may change clothing, players in grade 20 or above may change facial details such as glasses, eyebrows, etc., and players in grade 30 or above may change some actions.

It can be seen that, compared with the prior art, the embodiments of the present invention enable the player to edit his/her avatar at the client and to transmit the avatar to the server so as to share with other players. In addition, in the embodiments of the present invention, the player is allowed to participate in the design of the avatar and share his/her works with other players, which increases the participation degree of the player in the online game and attracts more individuated players.

Hereinafter, a system for changing an avatar in an online game will be described in detail according to an embodiment.

Figure 4:
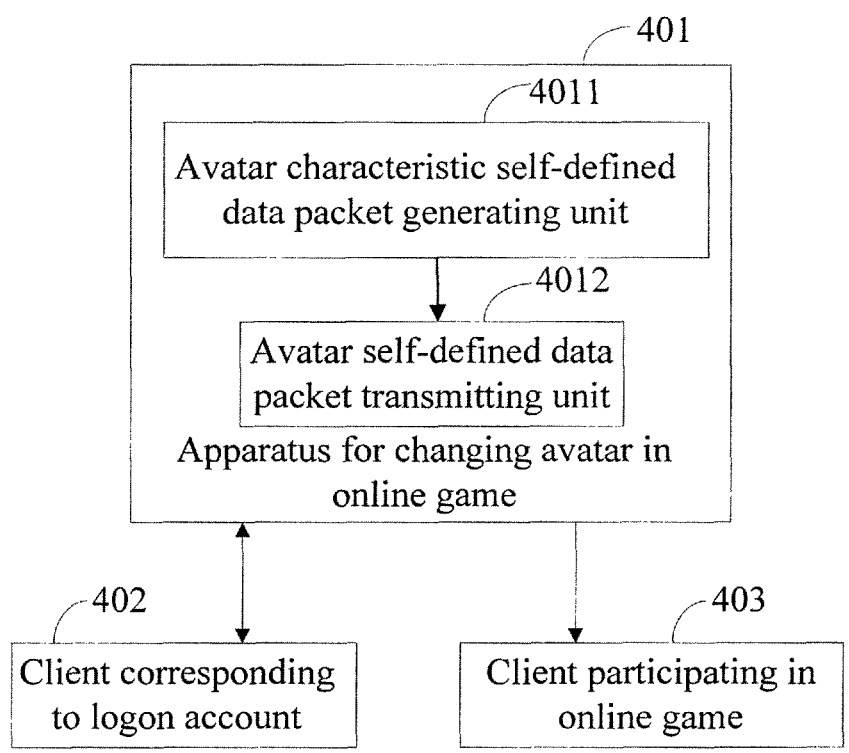
FIG. 4 shows a structure of a system for changing an avatar in the online game according to an embodiment of the present invention.

FIG. 4 shows a structure of the system for changing an avatar in the online game according to an embodiment of the present invention. As shown in FIG. 4, the system includes: an apparatus 401 for changing the avatar in the online game, a client 402 corresponding to a logon account and a client 403 participating in the online game.

The apparatus 401 is adapted to generate an avatar self-defined data packet according to an avatar characteristic self-defined data packet from the client 402, send the generated avatar self-defined data packet to the client 402, and/or the client 403.

Furthermore, the apparatus 401 is generally located in an online game server. Certainly, the apparatus 401 may also be located in other apparatuses providing online game background services, e.g. a certain node of a peer network structure.

In this embodiment, the apparatus 401 located in the online game server is taken as an exemplary example. The apparatus 401 may include: an avatar self-defined data packet generating unit 4011 and an avatar self-defined data packet transmitting unit 4012.

The avatar self-defined data packet generating unit 4011 is adapted to generate an avatar self-defined data packet according to an avatar characteristic self-defined data packet from the client 402, and send a transmission request to the avatar self-defined data packet transmitting unit 4012.

Before the avatar self-defined data packet generating unit 4011 generates the avatar self-defined data packet, the client 402 has already logged on the server where the apparatus 401 is located and has sent a request for changing the avatar to the server. For example, the client 402 sends an avatar self-defined request to the server. The server replies the avatar self-defined request and allows the client 402 to send the avatar characteristic self-defined data packet.

The avatar characteristic self-defined data packet is a data packet edited by the player at the client. The data packet reflects the player's modification or creation to the avatar.

The avatar self-defined data packet includes complete data of the avatar. The complete data are formed by combining the data of an original avatar, i.e. the avatar previously defined in the online game, with the self-defined data for defining some characteristics of the avatar in the avatar characteristic self-defined data packet. Thus, a complete self-defined avatar may be obtained through the avatar self-defined data packet.

The avatar self-defined data packet transmitting unit 4012 is adapted to provide, after receiving the transmission request, the avatar self-defined data packet to the client corresponding to a logon account providing the avatar self-defined data packet, and/or other clients participating in the game, i.e. the client 402, and/or client 403.

According to the embodiments of the present invention, a player is allowed to modify or edit the avatar in the online game and allowed to send the self-defined avatar to the clients of other players through the server. Compared with the prior art, the embodiments of the present invention enable the player to edit his/her avatar at the client, and send the avatar to the server to be shared with other players. Furthermore, through the embodiments of the present invention, the player may participate in the design of the avatar and share his/her works with other players, which increases the participation degree of the player in the online game and can attract more individuated players.

The above embodiments of the present invention provide complete steps and components for implementing the present invention. Those skilled in the art can implement the solution of the present invention according to the disclosure of the present invention and the related art without any inventive work.

The foregoing descriptions are only preferred embodiments of this invention and are not for use in limiting the protection scope thereof. Any changes and modifications can be made by those skilled in the art without departing from the spirit of this invention and therefore should be covered within the protection scope as set by the appended claims.

What is claimed is:

1. A method for changing an avatar associated with a player in an online game, the avatar characterized by an avatar data packet comprising a plurality of avatar characteristic identifiers and a set of avatar characteristic data, each of the plurality of avatar characteristic identifiers associated with a one of the set of avatar characteristic data in the avatar data packet, the method comprising:
    parsing, by a server, an avatar characteristic self-defined data packet from a client computing device, through which a player logs on a server using the player's registered account on the internet, corresponding to a logon account to obtain from the avatar characteristic self-defined data packet one of the plurality of avatar characteristic identifiers which corresponds to avatar characteristic requiring modification and avatar characteristic data corresponding to the obtained avatar characteristic identifier, wherein the avatar characteristic self-defined data packet reflects modification or creation made by a player to the avatar and wherein the avatar characteristic self-defined data packet comprises the one of the plurality of avatar characteristic identifiers and associated avatar characteristic data;
    determining, by the server, whether the avatar characteristic data in the avatar characteristic self-defined data packet extends beyond a pre-defined scope;
    if the avatar characteristic data in the avatar characteristic self-defined data packet does not extend beyond the pre-defined scope, finding, by the server, the avatar data packet corresponding to the logon account, and replacing, by the server, avatar characteristic data corresponding to a one of the plurality of avatar characteristic identifiers in the avatar data packet with the avatar characteristic data corresponding to the same avatar characteristic identifier in the avatar characteristic self-defined data packet to obtain a replaced data file;
    storing, by the server, the replaced data file as an avatar self-defined data packet, wherein the avatar self-defined data packet includes complete avatar data which are formed by combining an original avatar pre-defined in the game with the avatar characteristic self-defined data in the avatar characteristic self-defined data packet; and
    transmitting, by the server, the avatar self-defined data packet to the client computing device corresponding to the logon account providing the avatar characteristic self-defined data packet, and/or a second client computing device participating in the online game and displaying the avatar.

2. The method of claim 1, further comprising:
    when the second client computing device requires the avatar defined by the client computing device corresponding to the logon account providing the avatar characteristic self-defined data packet, checking settings of a logon account corresponding to the second client computing device, determining whether the logon account corresponding to the second client computing device allows using a self-defined avatar, if the logon account corresponding to the second client computing device allows using the self-defined avatar, transmitting the avatar self-defined data packet to the second client computing device.

3. The method of claim 1, further comprising:
    after transmitting the avatar self-defined data packet to the client computing device corresponding to the logon account providing the avatar characteristic self-defined data packet, and/or the second client computing device, storing, by the client computing device corresponding to the logon account providing the avatar characteristic self-defined data packet and/or a logon account corresponding to the second client computing device, the avatar self-defined data packet; and
    when the avatar in the avatar self-defined data packet is needed, invoking the avatar self-defined data packet stored by the client computing device corresponding to the logon account providing the avatar characteristic self-defined data packet and/or the logon account corresponding to the second client computing device.

4. The method of claim 3, further comprising:
    when logging on through the logon account providing the avatar characteristic self-defined data packet for a second time, checking whether data in the stored avatar self-defined data packet is consistent with current avatar self-defined data corresponding to the logon account providing the avatar characteristic self-defined data packet, and updating the stored avatar self-defined data packet if not consistent.

5. The method of claim 1, wherein the avatar characteristic self-defined data packet which is from the client computing device and corresponds to the logon account is formed through:
    transmitting the one of the plurality of avatar characteristic identifiers to the client computing device;
    taking, by the client computing device, a picture edited by an image processing file as the self-defined avatar characteristic data corresponding to the one of the plurality of avatar characteristic identifiers; and
    storing the one of the plurality of avatar characteristic identifiers and the associated self-defined avatar characteristic data corresponding to the one of the plurality of avatar characteristic identifiers in a pre-defined format to form the avatar characteristic self-defined data packet.

6. The method of claim 5, wherein avatar characteristics in the avatar characteristic self-defined data packet comprise visual characteristics, voice characteristics and action characteristics of the avatar.

7. An apparatus for changing an avatar associated with a player in an online game, the avatar characterized by an avatar data packet comprising a plurality of avatar characteristic identifiers and a set of avatar characteristic data, each of the plurality of avatar characteristic identifiers associated with a one of the set of avatar characteristic data in the avatar data packet, comprising: an avatar self-defined data packet generating unit and an avatar self-defined data packet transmitting unit; wherein
    the avatar self-defined data packet generating unit is adapted to parse an avatar characteristic self-defined data packet from a client computing device, through which a player logs on a server using the player's registered account on the internet corresponding to a logon account to obtain from the avatar characteristic self-defined data packet one of the plurality of avatar characteristic identifiers which corresponds to avatar characteristic requiring modification and avatar characteristic data corresponding to the obtained avatar characteristic identifier; determine whether the avatar characteristic data in the avatar characteristic self-defined data packet extends beyond a pre-defined scope; if the avatar characteristic data in the avatar characteristic self-defined data packet does not extend beyond the pre-defined scope, find the avatar data packet corresponding to the logon account, and replace avatar characteristic data corresponding to a one of the plurality of avatar characteristic identifiers in the avatar data packet with the avatar characteristic data corresponding to the same avatar characteristic identifier in the avatar characteristic self-defined data packet to obtain a replaced data file; store the replaced data file as an avatar self-defined data packet; and send a transmission request to the avatar self-defined data packet transmitting unit; wherein the avatar characteristic self-defined data packet reflects modification or creation made by a player to the avatar and wherein the avatar characteristic self-defined data packet comprises the one of the plurality of avatar characteristic identifiers and associated avatar characteristic data, and the avatar self-defined data packet includes complete avatar data which are formed by combining an original avatar pre-defined in the game with the avatar characteristic self-defined data in the avatar characteristic self-defined data packet; and the avatar self-defined data packet transmitting unit is adapted to transmit, after receiving the transmission request, the avatar self-defined data packet to the client computing device corresponding to the logon account and/or a second client computing device participating in the online game and displaying the avatar.

\* \* \* \* \*